Figure 1:
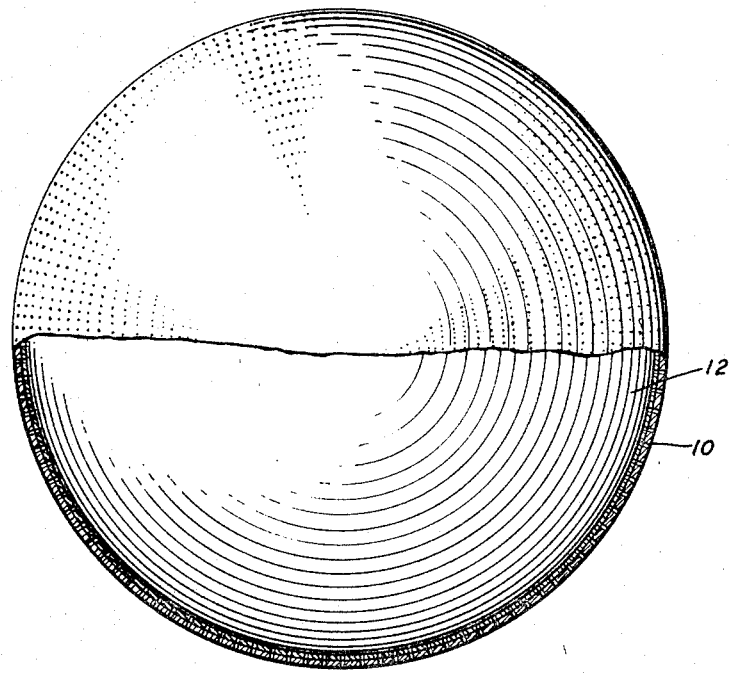

INVENTOR
C. C. CUTLER
ATTORNEY

3,184,742
BALLOON COMMUNICATION SATELLITE
Cassius C. Cutler, Gillette, N.J., assignor to Bell Telephone Laboratories, Incorporated, New York, N.Y., a corporation of New York
Filed Dec. 22, 1960, Ser. No. 77,700
2 Claims. (Cl. 343—18)

This invention relates to satellites for use as passive repeaters in communication systems and more particularly to arrangements for maintaining the configuration of balloon-type satellites for extended periods.

One class of satellite vehicle which has found application as the passive repeater station of a line-of-sight communication system involves a large balloon which is treated on its exterior surface to reflect radio waves and is inflated after injection in orbit. Such balloons, which are normally spherical, serve as isotropic reflectors for incident radio waves and have been used successfully in such communication experiments as those performed in connection with the now well-known Project Echo.

It will be recognized that one of the problems attendant upon the use of such relatively fragile objects as the repeater or reflector in a communication system involves the necessity of maintaining the shape of the reflecting surface to a high degree of constancy. It has been observed, for example, that with the passage of time such communication satellites appear to suffer from periodic changes in shape. These are accompanied by significant and rather deleterious variations in the strength of radio signals received from a remote transmitter by way of reflection from the surface of the satellite vehicle. Typically, the satellite vehicle is inflated or erected once it is launched in orbit by releasing within the envelope a quantity of sublimating powder which provides a sufficient gaseous pressure to expand the envelope to spherical form and to maintain it in this form for a substantial period.

It will be understood that in outer space the near vacuum which represents the ambient condition makes possible the inflation of a very large balloon with a very small supply of gas. Over an extended period of time, however, punctures in the envelope of the baloon produced by micrometeorites, and/or reduction in pressure produced when the balloon travels for extended portions of its orbit in eclipse, result in a net decrease in the forces available for maintaining the spherical outline of the balloon. Under these circumstances, the greatest force acting upon the exterior of the balloon may become the solar radiation pressure and this force varies periodically as the satellite travels in and out of eclipse. It is believed that these periodic variations cause undulations to build up in the envelope of the balloon, resulting in substantial variations in its efficiency as a reflector.

Heretofore, suggestions for overcoming the problems outlined above have involved proposals for making the envelope of the balloon stiffer so that it will have sufficient inherent strength to resist variations in solar radiation pressure and so that it may maintain the desired form despite the escape of the gas employed for its initial inflation. These proposals all suffer from the fact that the provision of a stiff envelope is inconsistent with the primary requirement that the vehicle be collapsible so that it may be carried within a rocket vehicle of a reasonable size for its trip from earth to its orbital station.

It is accordingly the object of the present invention to improve balloon-type satellite vehicles and to minimize variations in the configuration of the vehicle after it has been launched in orbit.

In accordance with the above object, a satellite balloon is arranged for easy folding for transport to orbit and is provided with means for damping out such undulations of the balloon as may be produced by exterior forces after the initial inflating medium has been dissipated.

Figure 2:
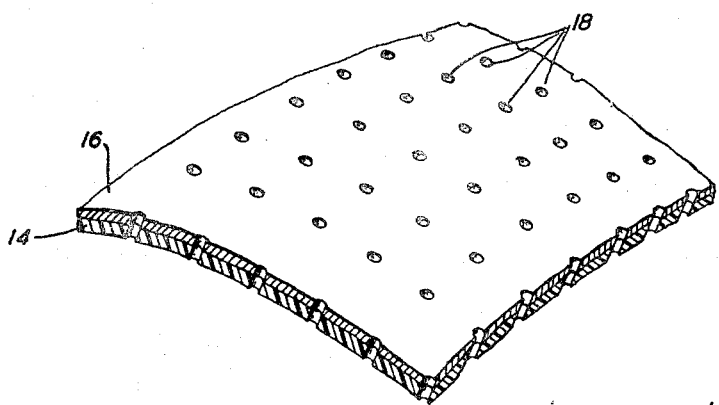

The above and other features of the invention will be considered in the following detailed specification taken in connection with the drawing in which:

FIG. 1 is a representation of an inflated satellite balloon partially broken away to illustrate the damping means according to the invention; and FIG. 2 is a perspective view on a greatly enlarged scale of a small portion of the pliable material forming the envelope of the balloon shown in FIG. 1.

As indicated above, the basic approach, according to the invention, is to accept the fact that a highly flexible or pliable balloon envelope cannot be sufficiently stiffened to resist undulations produced by solar radiation pressure once the intial inflation medium has been dissipated and to provide means for damping out such undulations. While many means for producing the required damping of such undulations may be envisioned, one simple embodiment of the invention is illustrated in the drawing.

Basically, and as illustrated in FIG. 1, the satellite vehicle comprises an outer balloon, the envelope of which is formed of pliable material. Such a balloon, illustrated at 10 in FIG. 1, may be made of sufficiently thin material, for example, to permit a one hundred foot diameter balloon to be folded to fit within a three foot diameter package for easy transport to orbit. The outer surface of the balloon may be treated with a thin coating of sputtered aluminum or otherwise to make it conductive and thus capable of reflecting radio frequency energy. According to the invention, a second balloon 12, also made of pliable material but not having the reflecting coating on the outer side of its envelope, is made of slightly smaller diameter than outer balloon 10 and is located within balloon 10. Under these conditions, the source of inflating gas or force is located within the inner balloon and the two are folded together for transport of the satellite vehicle to its orbital station.

After the vehicle has reached and has been injected into orbit, the two concentric balloons are inflated and normally will remain out of contact with one another. This condition will obtain so long as the source of inflating gas is present. When this has been dissipated, however, the largest force available for maintaining the shape of the balloon is the thermal radiation pressure resulting from the fact that the temperature of the balloon will be raised above the ambient temperature of outer space. This inflating force, which is only of the order of $3 \times 10^{-8}$ millimeters of mercury, will be sufficient to maintain the shape of the balloon to a substantial degree. However, analysis of the system will indicate that the thermal radiation pressure within the inner balloon, and between the innner balloon and the outer balloon, will be the same. Thus, the inner balloon will be collapsed and will have no useful contribution to offer in maintaining the spherical shape of the outer balloon. If, however, means are available for maintaining the inner balloon inflated to substantially spherical configuration, then whatever undulations begin to develop in the outer balloon as it travels in and out of eclipse, for example, will cause contact between the envelopes of the two balloons and the resulting friction will tend to damp out the energy of undulating motion. This may be accomplished, according to one embodiment of the invention, by treating the envelope of the outer balloon in such a way as to make it semi-transparent to the energy of thermal radiation. If this is done, the conditions outlined above will be modified and sufficient force will be available to maintain inflation of the inner balloon. This may be explained in the following manner. Let it be assumed that the outer envelope is so made that half the heat energy will pass through it. Then the temperature difference, and thus the inflating force experienced by the inner balloon, will be the result of the difference between the temperature of the balloon and the cold of outer space. If the transmission of the envelope of the outer balloon is exactly one half, then one half of the force due to radiation pressure will be available to maintain the inflation of each balloon.

The desired modification of the heat-transmission characteristics of the outer balloon may be accomplished in many ways, of course. One convenient way, however, is to perforate the outer envelope with a very large number of small holes of diameter which is small as compared with the wavelength of the highest frequency radio signals to be reflected by the repeater. Such perforation of the outer envelope will, of course, accelerate somewhat the loss of inflating gas, but this is not important once the vehicle has been initially inflated in outer space. At the same time, such perforation of the envelope can be accomplished without material effect upon the reflecting characteristics of the envelope for the radio signals to be employed.

FIG. 2 of the drawing is a representation of a portion of the envelope of the outer balloon as it might appear if greatly enlarged. Here, the base fabric or material 14 may comprise a sheet of Mylar or similar plastic. Deposited upon this by a process known as metalizing is a coating of aluminum 16 which is located on the surface of the Mylar sheet that is to become the outer surface of the balloon envelope and which is provided to render the outer balloon reflective to microwave signals. Both the base sheet 14 and the metalized coating 16 are shown as perforated by a plurality of small holes, the size of which, as stated above, is small as contrasted with the wavelength of the highest frequency radio signal to be employed in the communication system.

It will be recognized that other arrangements may be provided for producing a balloon envelope which is, at the same time, reflective to radio frequency energy and semi-transparent to energy corresponding to thermal radiation pressure. Such coatings are, for example, disclosed in the copending application of D. L. Wood, Serial No. 778,743, filed December 8, 1958, assigned to the assignee of the present application, now abandoned. While the provision of the differential force required to maintain inflation of both balloons so that the inner balloon may serve as a body to be brought into frictional contact with the outer balloon upon undulations of the latter, represents a convenient method of providing the damping action required, any configuration, such that frictional contact between the outer envelope and another body may be produced when the envelope of the outer balloon undulates, will suffice to eliminate the undesired variations in the transmission path. For example, it may be desirable to provide a plurality of concentric balloons of slightly different diameters and to divide the thermal radiation forces between them by a choice of materials representing an extension of the principles set forth above.

What is claimed is:

1. A satellite vehicle for use as a passive repeater in a communication system comprising a first envelope of pliable material inflatable as a spherical balloon in orbit and a second envelope of pliable material inflatable in orbit to form a sphere concentric with said first envelope when inflated and of diameter exceeding that of said first envelope to minimize initial contact between said envelopes when inflated in orbit, but to permit frictional contact when the outer envelope is deformed, the material of said second envelope being coated with a conductive layer to reflect radio waves, said material also conducting heat radiation more readily than said first envelope.

2. A satellite vehicle for use as a passive repeater in a communication system comprising a first envelope of pliable material inflatable as a spherical balloon in orbit and a second envelope of pliable material inflatable in orbit to form a sphere concentric with said first envelope when inflated and of diameter exceeding that of said first envelope to minimize initial contact between said envelopes when inflated in orbit, but to permit frictional damping contact when the outer envelope is deformed, the material of said second envelope having a coating thereon rendering it reflective to radio waves and having a plurality of perforations therethrough which are small contrasted to the wavelength of radio waves to be reflected and render said second envelope partially transparent to the energy of thermal radiation.

References Cited by the Examiner

UNITED STATES PATENTS

| | | | |
|---|---|---|---|
| 1,329,584 | 2/20 | Marinis | 343—18 |
| 2,151,336 | 3/39 | Scharlau | 343—18 |
| 2,455,469 | 12/48 | Caspar | 343—18 |
| 2,492,800 | 12/49 | Isom | 244—31 |
| 2,542,823 | 2/51 | Lyle | 343—18 |
| 2,840,819 | 6/58 | McClellan | 343—18 |
| 2,886,263 | 5/59 | Ferguson | 244—31 |

CHESTER L. JUSTUS, *Primary Examiner.*

KATHLEEN CLAFFY, *Examiner.*